United States Patent [19]
Salvucci, Sr.

[11] Patent Number: 5,445,399
[45] Date of Patent: Aug. 29, 1995

[54] RETRACTABLE HAND TRUCK HAVING POSITIVE LEG LOCK

[76] Inventor: Frank S. Salvucci, Sr., 13714 Garden Rd., Pearland, Tex. 77581

[21] Appl. No.: 107,003

[22] Filed: Aug. 17, 1993

[51] Int. Cl.6 ................................................ B62B 1/12
[52] U.S. Cl. ............................... 280/47.27; 280/47.2; 280/641
[58] Field of Search .................. 280/47.18, 47.2, 47.24, 280/47.27, 641, 651, 47.23, 47.33; 414/490

[56] References Cited

U.S. PATENT DOCUMENTS

| | | | |
|---|---|---|---|
| 117,086 | 7/1871 | Lawrence | 280/47.33 |
| 627,284 | 6/1899 | Walker | 280/47.2 |
| 2,598,168 | 5/1952 | Hooz et al. | 280/47.2 |
| 2,606,770 | 8/1952 | Reichert . | |
| 2,710,759 | 6/1955 | Bayer et al. | 280/47.27 |
| 3,064,990 | 11/1962 | Salvucci . | |
| 3,578,353 | 5/1971 | Lockhart . | |
| 3,850,441 | 11/1974 | Peters et al. . | |
| 3,893,687 | 7/1975 | Victor | 280/47.27 |
| 4,009,891 | 3/1977 | Jensen . | |
| 4,284,286 | 8/1981 | Lewallen . | |
| 4,630,837 | 12/1986 | Kazmark . | |
| 4,681,330 | 7/1987 | Misawa . | |
| 4,822,070 | 4/1989 | Korona et al. . | |
| 5,160,153 | 11/1992 | Zan . | |

FOREIGN PATENT DOCUMENTS

| | | | |
|---|---|---|---|
| 60261 | 10/1954 | France | 280/47.33 |
| 126285 | 7/1949 | Sweden | 280/47.33 |

*Primary Examiner*—Brian L. Johnson
*Assistant Examiner*—Min S. Yu
*Attorney, Agent, or Firm*—Richard C. Litman

[57] ABSTRACT

A positive locking arrangement for a retractable leg of a collapsible hand truck. A slide connected to the hand truck front axle is retained within a slot formed in a tab connected to the retractable leg. The slide includes a projection interlocking the tab thereto. To disengage the locked members, the retractable leg must be swung backwardly in a first motion, thus aligning the slot with the projection. In a second motion, the slide is then raised, the projection just passing through the slot, and the slide continues to feed through the tab, coming to a final vertical position parallel to and against the hand truck body. The slide terminates at an angle, thus cooperating with the tab so as to be urged by gravity to a lowermost position, thus favoring engagement. The tab is inclined to extend upwardly from its anchoring point, thus limiting downward movement of the slide. A removable pin or hook is inserted into the slot when it is desired to secure the slide in the deployed, locked condition. A chain of excessive length tethers the pin to the hand truck.

13 Claims, 5 Drawing Sheets

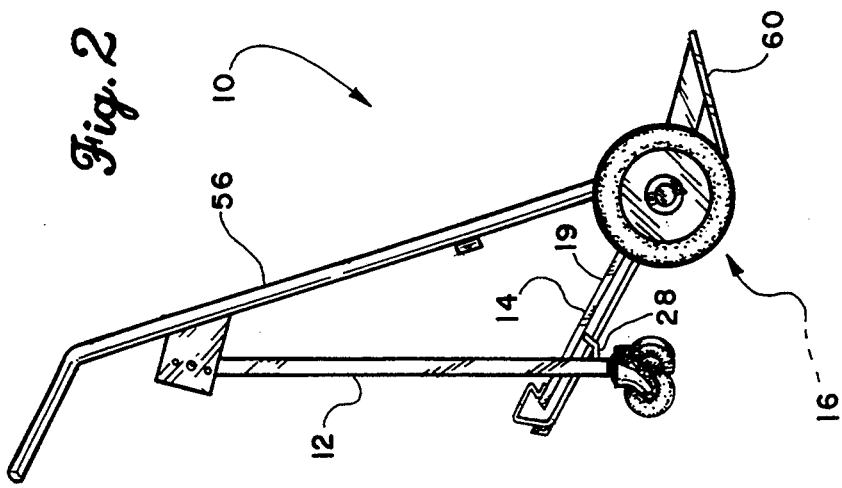
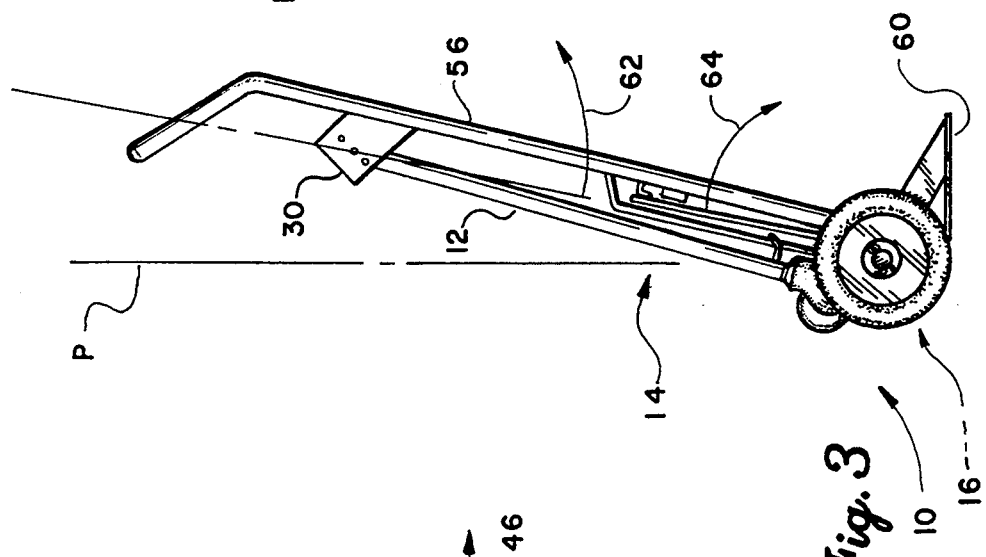
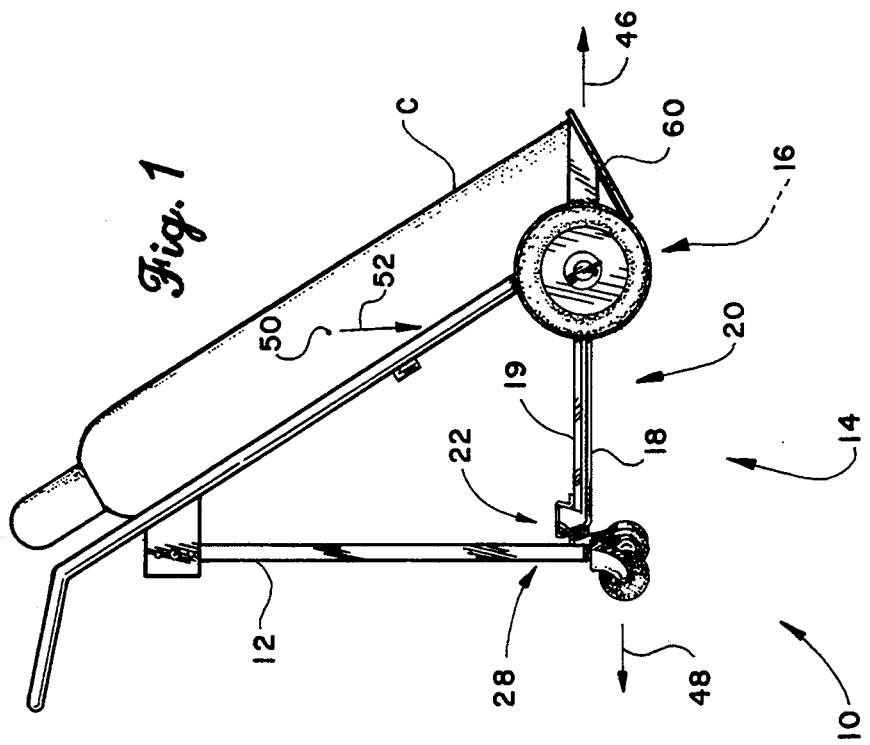

RETRACTABLE HAND TRUCK HAVING POSITIVE LEG LOCK

BACKGROUND OF THE INVENTION

1. Field of the Invention

The present invention relates to hand trucks, and more particularly, to an arrangement of a retractable third leg thereof wherein the third leg is positively locked in a deployed position, and is manually released therefrom to enable collapsed stowage of the hand truck.

2. Description of the Prior Art

U.S. Pat. No. 3,064,990, issued to Anthony R. Salvucci on Nov. 20, 1962, discloses a retractable gas cylinder cart wherein a strut extends from the front axle, engaging a loop formed in a tab attached to the retractable third leg. This invention provides a simple over-center mutual engagement between strut and tab, and components are held in place solely by gravity. Like the present invention, a rod member of the strut passes through the loop, enabling the strut to assume a progressively more vertical position when the third leg is collapsed, or folded. However, construction of the '990 device differs from that of the present invention, and specifically fails to provide two points of interfering engagement, as found in the present invention, which contribute to secured extension of the third leg.

U.S. Pat. Nos. 3,578,353 and 4,630,837, issued respectively to Robert J. Lockhart on May 11, 1971, and to Eugene A. Kazmark on Dec. 23, 1986, exemplify the use of notched brackets engaging struts to secure a retractable leg in a deployed position. These inventions also lack the two points of interfering engagement mentioned above.

None of the above inventions and patents, taken either singly or in combination, is seen to describe the instant invention as claimed.

SUMMARY OF THE INVENTION

The present invention provides a positive locking arrangement for a hand truck having a retractable leg. Such hand trucks are typically employed to transport heavy objects, such as high pressure gas containing cylinders. A gas cylinder may easily weigh several hundred pounds and may contain pressures above 2250 psi. Since heavy objects generally, and vessels containing reactive gasses under very high pressure in particular, present severe hazards if they fall from a hand truck, it follows that to render a hand truck stable is highly desirable. Hand trucks having two axles have been provided to remove the burden of balancing a heavy object on a teetering, single axle hand truck, thus freeing the user to concentrate on propelling the heavy load. However, such hand trucks, which typically have an "A" shaped configuration defined by front and rear legs, are quite bulky, awkward to maneuver, and require considerable storage space.

Retractable legs have answered these objections, but present new problems. If the leg retracts, even partially, while a gas cylinder is being moved, resultant instability threatens to upset the cylinder, possibly resulting in the hazards mentioned above.

The present invention addresses these concerns by providing a retractable type hand truck including a positive locking arrangement having plural locking features and which is easily manually operated. By contrast, the invention disclosed by Anthony R. Salvucci has a singular, over-center arrangement to prevent unintended retraction. If the disarmingly simple geometry included therein is not carefully duplicated in manufacturing, the resultant hand truck is susceptible to unexpected collapse. It is therefore intentional that the present invention include features requiring separate, discreet members which cannot be ignored by a manufacturer, and which are far less susceptible to being rendered ineffective by careless manufacture.

A specially configured slide member is retained within a slotted tab. The slide describes a closed loop which passes through the slot, thus positively connecting the tab, which is attached to the retractable hand truck leg, to the slide, which is connected to the remaining hand truck leg.

The slide, which is rotatably connected at one end to the hand truck front axle, is constantly urged by gravity to incline downwardly at its other end. This characteristic is employed advantageously to prevent unintended retraction.

A member projecting from the slide interfits beneath the tab, and the slide can be disengaged only after the retracting leg, and thus the tab, is moved. The tab is configured to abut an interior corner of the slide closed loop, thus preventing the slide from rotating downwardly. These constraints enable the slide to move in a limited fashion, reducing opportunity for unintended collapse of the retractable leg.

A hook is removably inserted into the slot, thus locking the slide in a deployed position. As used herein, "deployed" refers to the condition in which the retractable leg is extended to support a load, and the locking arrangement is active, thus locking the retractable leg in place and resisting retraction.

The hook is tethered to the hand truck by a chain of length so great that when not inserted in the slot, the chain and hook trail on the ground and will invariably obstruct the wheels. This creates a nuisance cured by deploying the hook as intended.

Accordingly, it is a principal object of the invention to provide a hand truck including a retractable leg having a positive locking arrangement.

A second object of the invention is to provide a leg locking arrangement requiring an uncomplicated, two component motion to disengage the locking arrangement.

It is another object of the invention to provide a leg locking arrangement requiring a two component motion to disengage the locking arrangement wherein one motion component is opposed by gravity.

Still another object of the invention is to provide a leg locking arrangement wherein one of the engaged locking components is constrained by associated locking components against a motion in any direction except a direction opposed by gravity.

it is a further object of the invention to provide a leg locking arrangement wherein a load borne by the cart biases the locking components into a locked orientation.

It is still a further object of the invention to enable a locking component to be displaced upwardly against gravity without attaining sufficient displacement as to cause disengagement of the locked components.

An additional object of the invention is to provide a removable pin insertable into the locking components so as further to prevent likelihood of disengagement.

A still further object of the invention is to provide a tether securing the pin to the hand truck, the tether being of such length as to cause a nuisance if the pin is ignored.

Still another object of the invention is to provide a hand truck having a retractable leg wherein the leg and associated controlling linkage are, when in a stowed condition, gravity biased to resist moving into a deployed condition.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a side elevational environmental view of the invention, showing the retractable leg secured in a deployed position.

FIG. 2 is a side elevational view of the invention, showing the retractable leg and associated slide partially retracted.

FIG. 3 is a side elevational view of the invention, showing the retractable leg fully retracted and stowed, inclination of the cart being exaggerated for clarity of understanding.

Similar reference characters denote corresponding features consistently throughout the attached drawings.

DETAILED DESCRIPTION OF THE PREFERRED EMBODIMENT

Figure 4:
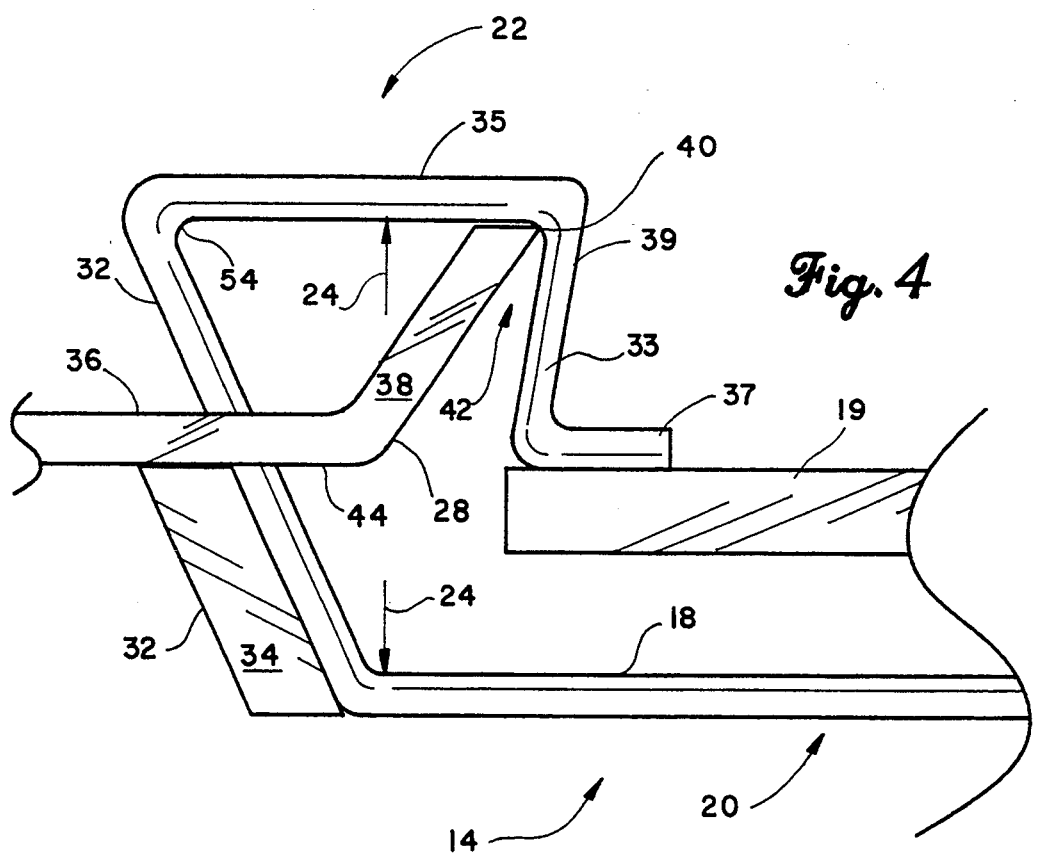
FIG. 4 is a side elevational detail view of the slide engaging its associated tab.

The present invention provides an uncomplicated, manually operated locking arrangement enabling a gas cylinder cart 10 or hand truck having a retractable third leg 12 to be secured selectively in a deployed condition, as shown in FIG. 1, and in a stowed condition, as seen in FIG. 3. Cart 10 can be wheeled from one place to another while carrying a gas cylinder C when in the deployed condition. FIG. 2 shows an intermediate position of the respective components as the retractable leg 12 is stowed and deployed.

A slide 14 is pivotally mounted to the front axle 16 of cart 10, and includes a closed loop defined by rod members 18 and arm 19. Slide 14 includes an elongated portion 20 and a trapezoidal latching end 22. Latching end 22 has height, as indicated by arrows 24,24 (see FIG. 4). Latching end height is greater than and extends above a similar height bounding the open area of elongated portion 20. The loop thus defined passes through a slot 26 formed in a tab 28 secured to retractable leg 12.

Slide 14 and tab 28 interact in the following way. Starting from the stowed configuration illustrated in FIG. 3, retractable leg 12 is swung away from front axle 16, this being shown in progress in FIG. 2. It will be noted that retractable leg 12 pivots at mounting tab 30, and slide 14 pivots about front axle 16. Slide 14 feeds through tab 28, as will be further explained hereinafter, until slide latching end 22 engages tab 28 in one of several ways. At this point, best seen in FIG. 1, slide 14 prevents further swing of retractable leg 12 by captive retention, and these two components 12,14 are immobilized by interfit and gravity.

Figure 5:
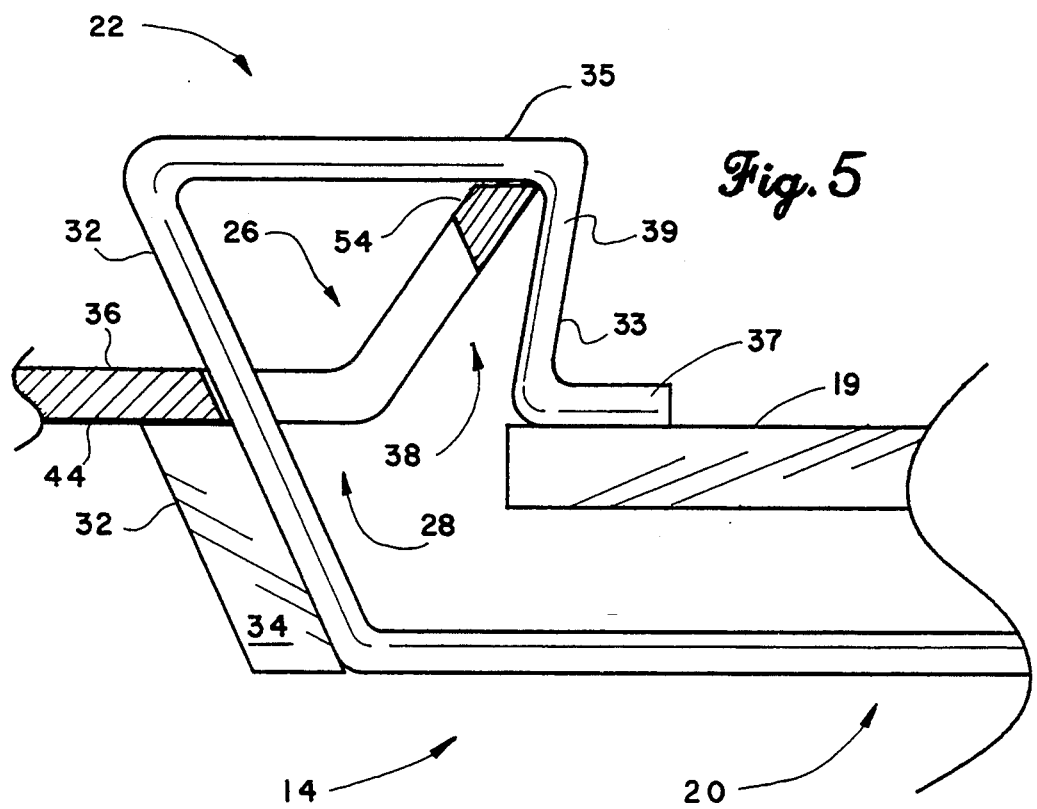
FIG. 5 is a side elevational detail view of the components of FIG. 4, shown partially in cross section.
Figure 9:
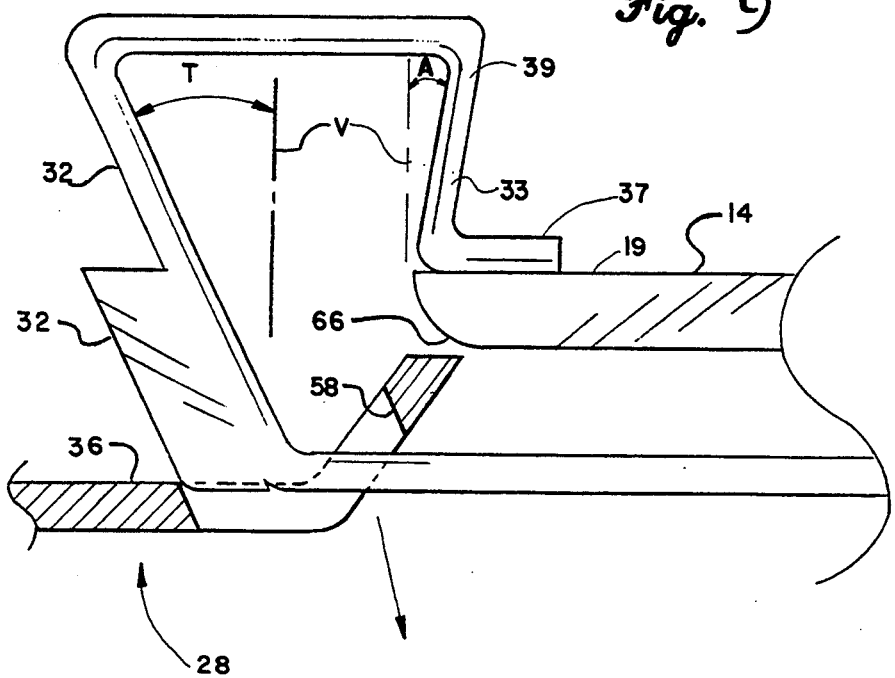
FIG. 9 is a side elevational, partially cross sectional, detail view of the components of FIG. 4, showing the slide aligned to drop through the slot in the tab.

Referring now to FIGS. 4 and 5, trapaezoidal slide latching end 22 is seen to include an inclined front end 32, a rear end 33, a top end 35, and a projection 34. Rear end 33 includes a horizontal section 37 mounted above and parallel to arm 19 and an inclined section 39 extending upwardly from arm 19. Inclined section 39 engages top end 35 to form an interior corner 42. With particular reference to FIG. 9, inclined section 39 is inclined at an angle A from a vertical direction V, away from or opposite front end 32 and toward front axle 16 of cart 10. When retractable leg 12 is in the deployed condition depicted in FIG. 1, downward pivot of slide 14 is arrested by interference with tab 28.

Tab 28 includes a first section 36 extending horizontally, and a second section 38 continuing first section 36 at an upward inclination. Slot 26 extends from second section 38 to at least a line of contact 99 between second section 38 and first section 36, as particularly shown in FIG. 8. When tab 28 and slide 14 are aligned (see FIGS. 6 and 7), mutual vertical travel or play is enabled. Possible disengagement therebetween, arising from unintended upward displacement of slide 14, is resisted by gravity, due to weight of slide 14.

Tab 28 has a front edge 40 which engages interior corner 42 formed in slide 14 when cart 10 is subjected to forces pushing or pulling from the front or back thereof. Simultaneously, projection 34 slides under tab bottom surface 44, and prevents upward motion of slide latching end 22. Thus, slide 14 and tab 28 engage in two ways. Advance of tab 28 and, therefore, of retractable leg 12 back toward the retracted condition is stopped by abutment of tab front edge 40 against slide interior corner 42 (see FIG. 4). Also, lifting of slide 14, which would enable slide 14 to feed through slot 26, and therefore would enable cart 10 to collapse, is opposed by interference between projection 34 and tab bottom surface 44.

Figure 10:
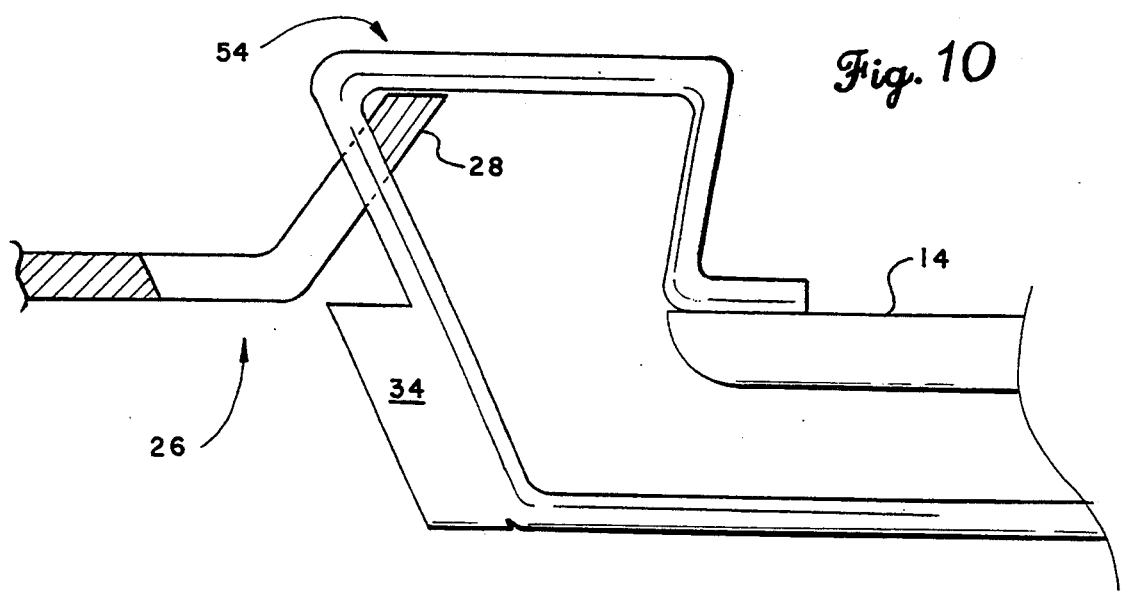
FIG. 10 is a side elevational, partially cross sectional, detail view of the components of FIG. 4, showing the slide after dropping through the slot in the tab.

Returning to FIG. 1, counteracting forces holding slide 14 and tab 28 immobilized are represented by arrows 46 and 48. Center of gravity of cart 10 in the deployed condition, represented by point 50, acts in a direction indicated by arrow 52. This force tends to spread front axle 16 and retractable leg 12 apart, as shown by arrows 46 and 48, respectively. As seen in FIG. 10, retractable leg 12 (see FIG. 1) is constrained against further spread by slide 14, tab 28 now engaging corner 54 of slide 14.

Cart 10 has moved into this deployed condition by enabling retractable leg 12 to swing outwardly from front axle 16 to the maximum extent. Distribution of weight as described above now prevents spontaneous retraction of retractable leg 12. The greater the weight acting in this manner, the more strongly is retractable leg 12 biased as it attempts to spread further from front axle 16, and thus, counter to a retracting condition. Presence of a gas cylinder C, which may weigh several hundred pounds (approximately one hundred kilograms), further stabilizes cart 10. As used herein, stability will refer to resistance of retractable leg 12 to return to its stowed condition, as shown in FIG. 3. In similar spirit, collapse will signify the return of retractable leg 12 to its stowed condition, or partly thereto, which would potentially enable cart 10 to topple.

Disruption of this stability, if not counteracted, would arise from lateral impacts, such as running into an obstruction at the front or rear, or due to a person kicking cart 10. Impacts from the front of cart 10 will merely push slide 14 into tab 28, in the configuration shown in FIG. 4. Such impact will result in projection 34 sliding under tab bottom surface 44, thus preventing slide 14 from jumping upwardly, which would enable retractable leg 12 to return to the stowed condition. A lateral impact from the rear will have the same effect on the relative positions of slide 14 and tab 28, and thus lateral impacts will tend to stabilize, and not collapse, cart 10.

Figure 6:
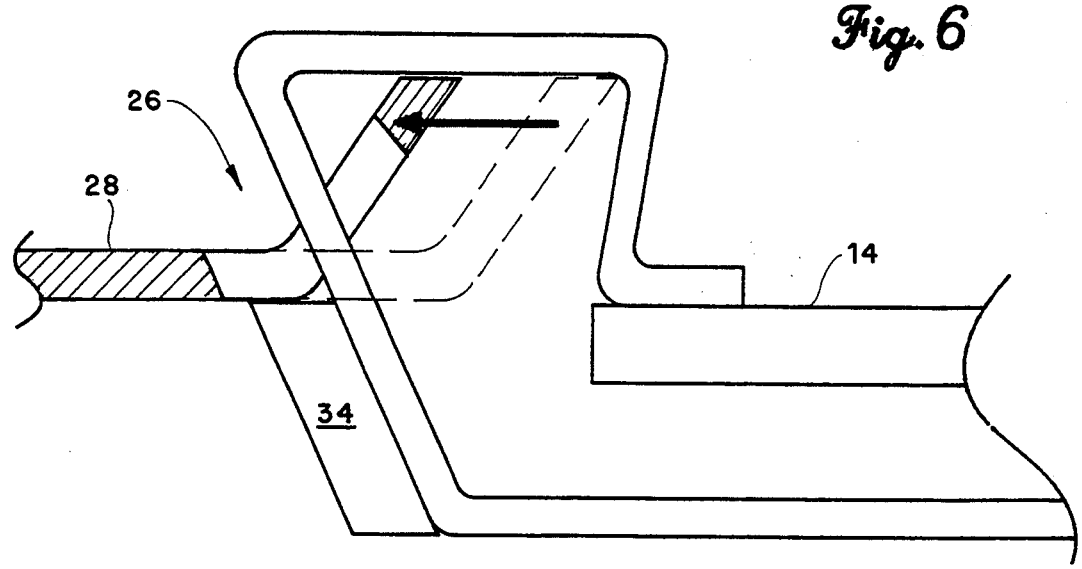
FIGS. 6 and 7 are side elevational detail views of the components of FIG. 4, illustrating motions required to disengage the slide from its associated tab.
Figure 7:
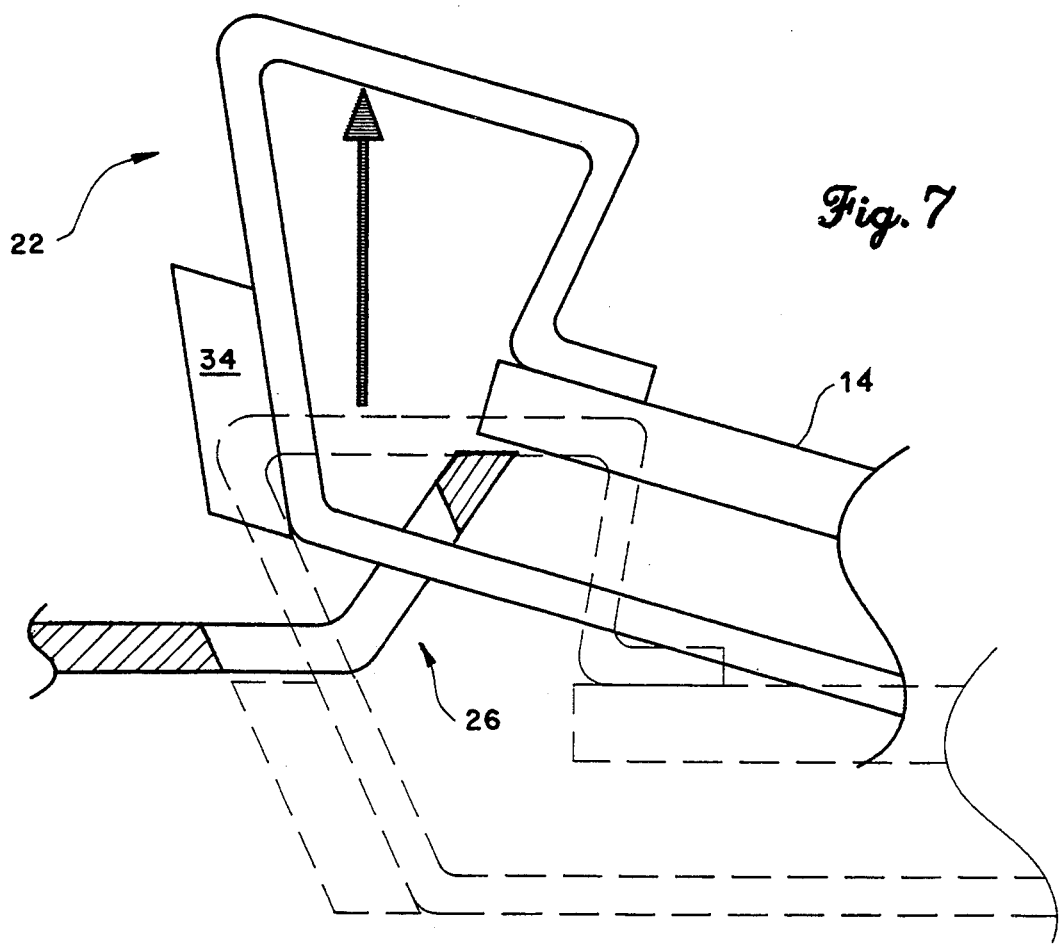
Figure 8:
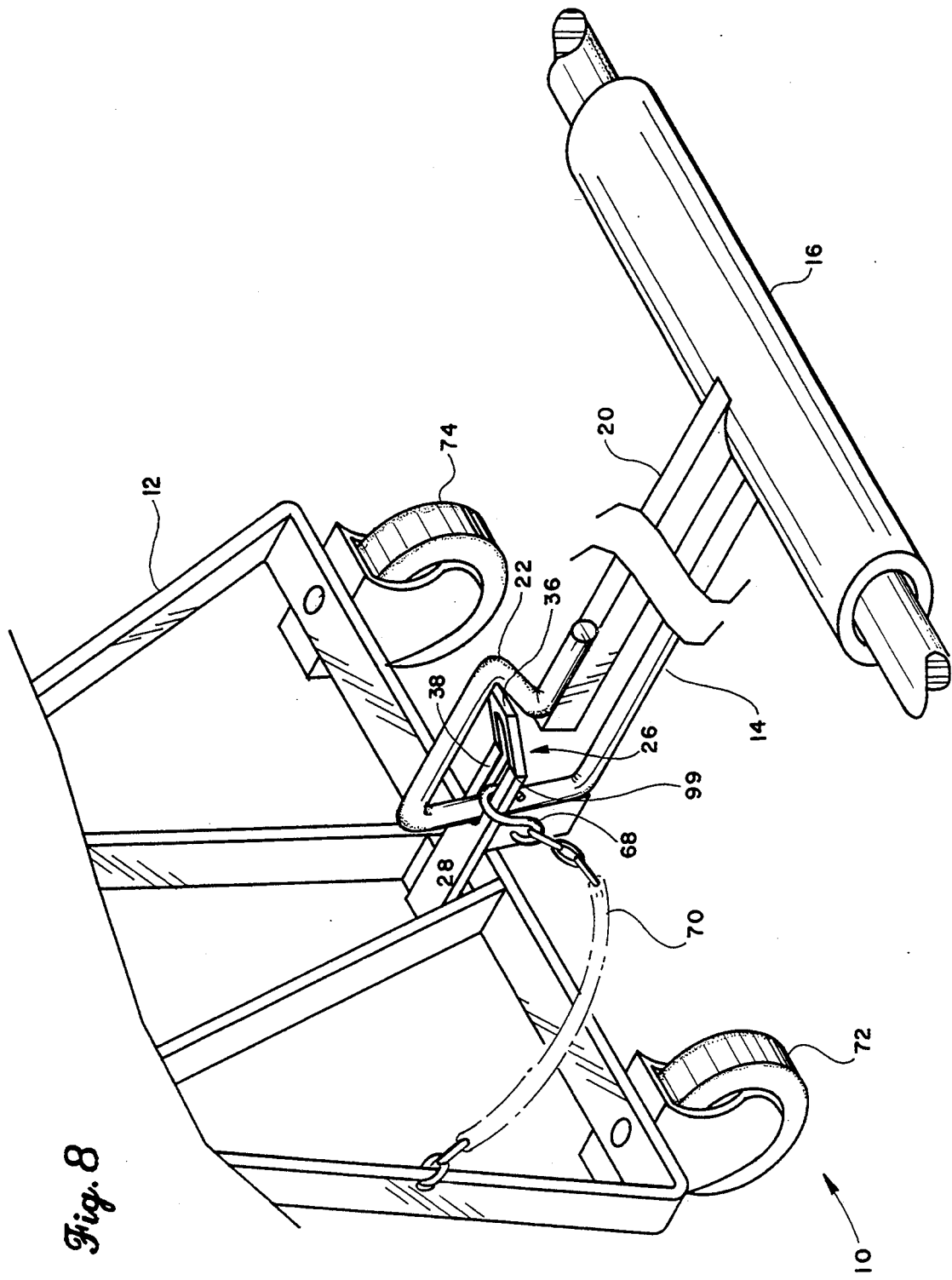
FIG. 8 is an oblique detail view of the components of FIG. 4, and also an optional immobilizing hook, and is partially broken away to illustrate attachment of the slide to the front axle of the cylinder cart.

Returning cart 10 to an unstable, partially deployed condition, which is preliminary to stowing retractable leg 12 and is exemplified in FIG. 2, requires a two step procedure. The first step, illustrated in FIG. 6, is to move tab 28 and, thus, retractable leg 12, away from front axle 16 (leg 12 and axle 16 not shown in FIG. 6). Projection 34 is then free to pass through slot 26. Next, latching end 22 of slide 14 is lifted, as seen in FIG. 7, so that projection 34 feeds through slot 26, slide 14 pivoting in a vertical plane about front axle 16 (see FIG. 2). This latter step moves against gravity, the weight of slide 14 resisting such movement, and would be stoutly resisted by the weight of a gas cylinder C carried in cart 10. Finally, the motion of the second step is continued until slide 14 is substantially vertical, and retractable leg 12 is drawn against the frame 56 of cart 10 (see FIG. 3).

It should be pointed out that even if slide latching end 22 were to jump up unintendedly through slot 26, it would quickly strike the top bounding member 58 of slot 26 (see FIG. 9). Gravity would then return slide 14 to its normal position.

Cart 10 naturally remains in the stowed configuration thus attained (see FIG. 3) due to advantageous location of pivot points and inclination of retractable leg 12 and slide 14 with respect to a perpendicular direction P. It will be seen that in the stowed configuration, and with cart 10 supported on front axle 16 and on load platform 60, both slide 14 and retractable leg 12 are biased to lean in a direction opposing the deployed state. Retractable leg 12 will tend to swing downwardly, as indicated by arrow 62. Similarly, slide 14 will swing in the direction indicated by arrow 64.

Cart 10 also naturally assumes the stable, fully deployed condition when almost fully spread. As shown in FIG. 9, when slide 14 is lowered to the point that slide corner 66 clears tab horizontal section 36, slide 14 drops into the deployed condition. Inclination of slide surface 32 engages tab 28 in a camming action and pushes retractable leg 12 to maximal displacement from front axle 16 (see FIG. 1). Deviation of this inclination from a vertical direction V is preferably between 58 and 62 degrees, as indicated by angle T in FIG. 9. Distribution of weight forces then stabilize cart 10 in the deployed condition, as previously discussed.

Still further securement in the deployed condition is provided by a hook 68, pin, or similar member, shown in Fi9. 8, which is removably inserted into slot 26. Hook 68 interferes with slide 14, thus entrapping slide 14 in slot 26. Hook 68 is attached to cart 10 by a tether 70 sufficiently long that it will trail on the ground if not placed in slot 26, and obstruct a caster wheel 72. The obstruction to rolling thus obtained is such a severe nuisance to a user that he or she will invariably be obliged to deploy hook 68 as intended.

It is to be understood that the present invention is not limited to the sole embodiment described above, but encompasses any and all embodiments within the scope of the following claims.

I claim:

1. A hand truck comprising:

a retractable leg having a proximal end and a distal end, main body means including a frame, at least one wheel attached to said frame, and a load platform attached to said frame, said retractable leg being pivotally attached to said frame at said proximal end, and retractable leg securement means for locking said retractable leg in a deployed condition, said securement means further comprising a slide attached to said main body, and a tab attached to said retractable leg, said tab including means defining an aperture therein, said slide including rod means disposed within said aperture and captively retaining said tab, said aperture constraining said rod means against lateral movement therebeyond, said slide extending in a substantially horizontal direction when said retractable leg is in a deployed condition, and said slide pivoting to extend in a substantially vertical direction when being moved to a stowed condition, both said directions being defined when said hand truck is supported in an upright orientation on a horizontal surface, said slide defining an enclosed space including a trapezoidal latching end having a front end facing said retractable leg and a rear end facing said main body means, said front end disposed at an inclination with respect to a vertical direction, said rear end disposed at an inclination with respect to a vertical direction opposite said front end, whereby said slide, when dropping by gravity through said aperture, engages said tab in a camming action and pushes said retractable leg to a deployed condition.

2. The hand truck according to claim 1, said latching end defining an interior corner, said tab interfering with said interior corner when said securement means are in a deployed condition, said tab thus abutting said slide, whereby said slide is constrained against downward motion past said tab.

3. The hand truck according to claim 1, said securement means further including a hook removably insertable into said aperture, whereby insertion of said hook constrains said slide against horizontal motion with respect to said tab, thus locking said securement means in a deployed condition.

4. The hand truck according to claim 3, further including a tether attaching said hook to said hand truck, said tether having length sufficient to enable said hook to trail on a horizontal surface supporting said hand truck when said hook is removed from said securement means.

5. The hand truck according to claim 1, wherein said slide and said retractable leg have pivot points arranged that, when said hand truck is in a retracted condition, said slide and said retractable leg lean under influence of gravity toward a stowed condition and away from a deployed condition.

6. A hand truck comprising:
a retractable leg having a proximal end and a distal end,
main body means including a frame, at least one wheel attached to said frame, and a load platform attached to said frame, said retractable leg being pivotally attached to said frame at said proximal end, and
retractable leg securement means for locking said retractable leg in a deployed condition, said securement means further comprising a slide attached to said main body, and a tab attached to said retractable leg, said tab including means defining an aperture therein, said slide including rod means disposed within said aperture and captively retaining said tab, said aperture constraining said rod means against lateral movement therebeyond,
said slide extending in a substantially horizontal direction when said retractable leg is in a deployed condition, and said slide pivoting to extend in a substantially vertical direction when being moved to a stowed condition, both said directions being defined when said hand truck is supported in an upright orientation on a horizontal surface,
said slide having projection means connected to the end of said slide, said projection means located beneath said tab when said securement means are in a deployed condition, whereby said slide is constrained against direct upward movement when in a deployed condition by interference with said tab, and said aperture having sufficient length to enable said projection means to pass therethrough when said tab is moved to align said projection means with said aperture, and when said slide is then lifted in an upward weight of said slide biasing said slide downwardly, thus opposing upward lifting of said slide.

7. The hand truck according to claim 6, said securement means further including a hook removably insertable into said aperture, whereby insertion of said hook constrains said slide against horizontal motion with respect to said tab, thus locking said securement means in a deployed condition.

8. The hand truck according to claim 7, further including a tether attaching said hook to said hand truck, said tether having length sufficient to enable said hook to trail on a horizontal surface supporting said hand truck when said hook is removed from said securement means.

9. The hand truck according to claim 6, wherein said slide and said retractable leg, have pivot points arranged such that, when said hand truck is in a retracted condition, said slide and said retractable leg lean under influence of gravity toward a stowed condition and away from a deployed condition.

10. A hand truck comprising:
a retractable leg having a proximal and a distal end,
main body means including a frame, at least one wheel attached to said frame, and a load platform attached to said frame, said retractable leg being pivotally attached to said frame at said proximal end, and
retractable leg securement means for locking said retractable leg in a deployed condition, said securement means further comprising a slide attached to said main body, and a tab attached to said retractable leg, said tab including means defining an aperture therein, said slide including rod means disposed within said aperture and captively retaining said tab, said aperture constraining said rod means against lateral movement therebeyond,
said slide extending in a substantially horizontal direction when said retractable leg is in a deployed condition, and said slide pivoting to extend in a substantially vertical direction when being moved to a stowed condition, both said directions being defined when said hand truck is supported in an upright orientation on a horizontal surface,
said slide defining an enclosed space having height, said tab having:
a first section extending horizontally and
a second section joined to said first section along a line of contact therebetween, said second section extending toward said slide and being inclined upwardly, such that said second section lies above said line of contact, said aperture extending from said second section to at least said first section, whereby vertical play between said tab and said slide is enabled, and displacement of said slide in an upward direction requires lifting said slide upwardly by at least said height, thus increasing, by gravity, resistance of said slide to unintended displacement and possible disengagement from said tab.

11. The hand truck according to claim 10, said securement means further including a hook removably insertable into said aperture, whereby insertion of said hook constrains said slide against horizontal motion with respect to said tab, thus locking said securement means in a deployed condition.

12. The hand truck according to claim 11, further including a tether attaching said hook to said hand truck, said tether having length sufficient to enable said hook to trail on a horizontal surface supporting said hand truck when said hook is removed from said securement means.

13. The hand truck according to claim 10, wherein said slide and said retractable leg, have pivot points arranged such that, when said hand truck is in a retracted condition, said slide and said retractable leg lean under influence of gravity toward a stowed condition and away from a deployed condition.

* * * * *